United States Patent [19]

Guichard et al.

[11] Patent Number: 5,111,498
[45] Date of Patent: May 5, 1992

[54] HINGED-CASE SOUND AND VISION COMMUNICATIONS TERMINAL, IN PARTICULAR A VIDEO-PHONE

[76] Inventors: Jacques Guichard, 8-10, rue des Morillons, 75015 Paris, France; Georges Buchner, 34, rue de Picpus, 75012 Paris, France; Jacques Labat, 98, rue Pierre Brossolette, 92320 Chatillon, France

[21] Appl. No.: 555,367

[22] Filed: Jul. 19, 1990

Related U.S. Application Data

[63] Continuation of Ser. No. 249,134, Sep. 26, 1988, abandoned.

[30] Foreign Application Priority Data

Sep. 25, 1987 [FR] France .................. 87 13318

[51] Int. Cl.⁵ .................................. H04N 7/14
[52] U.S. Cl. .................................. 379/53; 379/434; 358/85; 358/225
[58] Field of Search .......... 379/53, 54, 428, 434, 379/436, 440; 358/85, 185, 224, 225, 228

[56] References Cited

U.S. PATENT DOCUMENTS

| | | | |
|---|---|---|---|
| 2,909,600 | 10/1959 | Becker | 358/85 |
| 3,116,365 | 12/1961 | Prescott | 358/85 |
| 3,544,715 | 12/1970 | Herriott et al. | 358/85 |
| 3,567,848 | 3/1971 | Thies et al. | 379/53 |
| 3,755,623 | 8/1973 | Cassagne | 358/85 |
| 3,816,654 | 6/1974 | Brightman | 358/85 |
| 3,868,706 | 2/1975 | Steingold | 358/225 |
| 4,258,387 | 3/1981 | Lemelson et al. | 379/53 |
| 4,482,920 | 11/1984 | Yoshida et al. | 358/228 |
| 4,485,400 | 11/1984 | Lemelson et al. | 379/53 |
| 4,715,059 | 12/1987 | Cooper-Hart et al. | 379/53 |
| 4,856,045 | 8/1989 | Hoshina | 379/53 |

FOREIGN PATENT DOCUMENTS

| | | | |
|---|---|---|---|
| 2122726 | 11/1972 | Fed. Rep. of Germany | 379/53 |
| 3625646 | 2/1988 | Fed. Rep. of Germany | 379/53 |
| 0152387 | 11/1981 | Japan | 358/85 |
| 0180283 | 7/1988 | Japan | |

*Primary Examiner*—James L. Dwyer
*Assistant Examiner*—Wing F. Chan
*Attorney, Agent, or Firm*—Pollock, Vande Sande & Priddy

[57] ABSTRACT

A terminal for sound and vision communication, of the type associated, in particular, with a telephone set, comprises a case (100) containing a display screen monitor (128), a camera (132) provided with optics (130), an electronic assembly (134) for control, coding/decoding, and telephone line interfacing and control (114). The case (100) comprises a first part (110) via which the terminal is supported on a support surface, and a second part (120) which is hinged to the first part about a substantially horizontal axis (A) and which receives the camera (132) and its optics (130) together with the monitor (128). The terminal is such that, in use, the second part (120) of the case can assume at least two different angular positions relative to the first part (110), corresponding to two different aiming directions (B) for the camera.

11 Claims, 3 Drawing Sheets

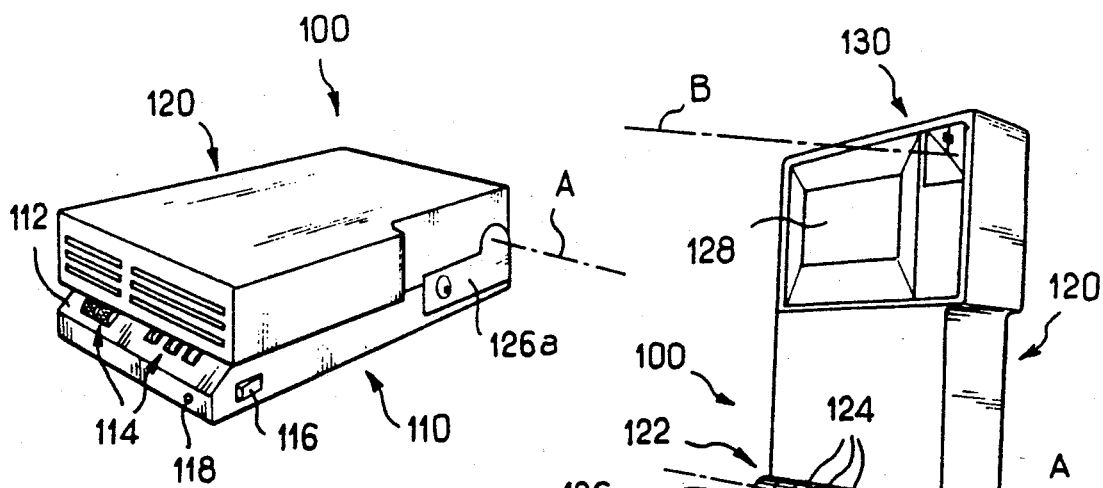
FIG.1a
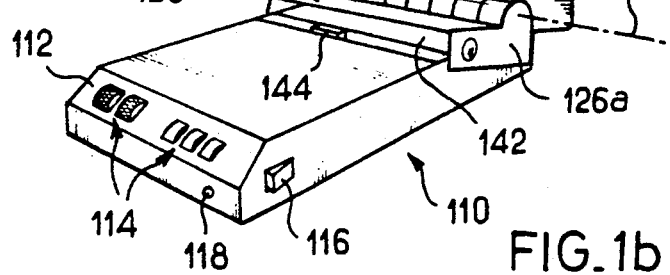
FIG.1b
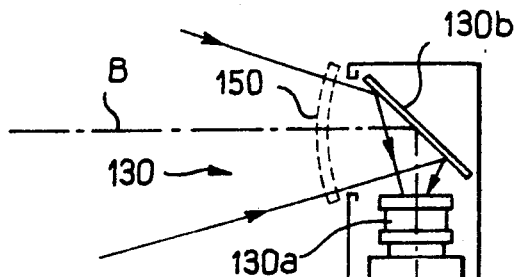
FIG.2
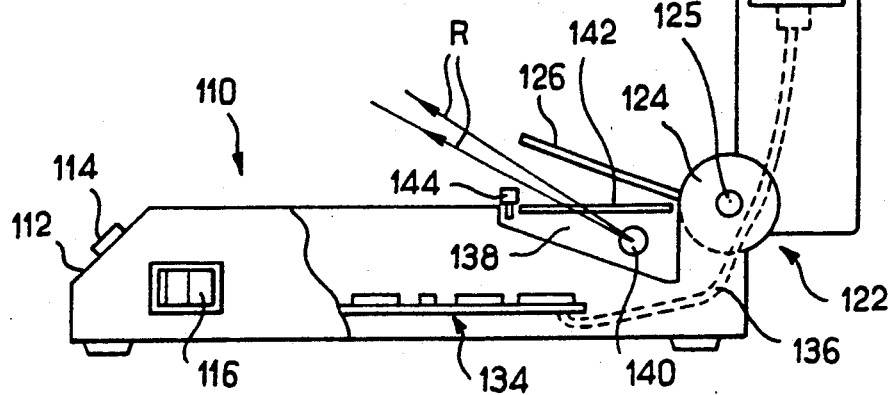

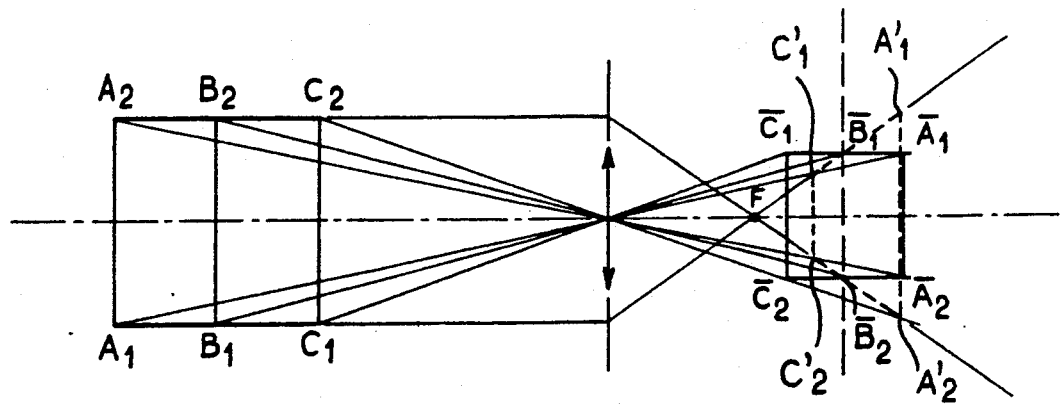
FIG_6
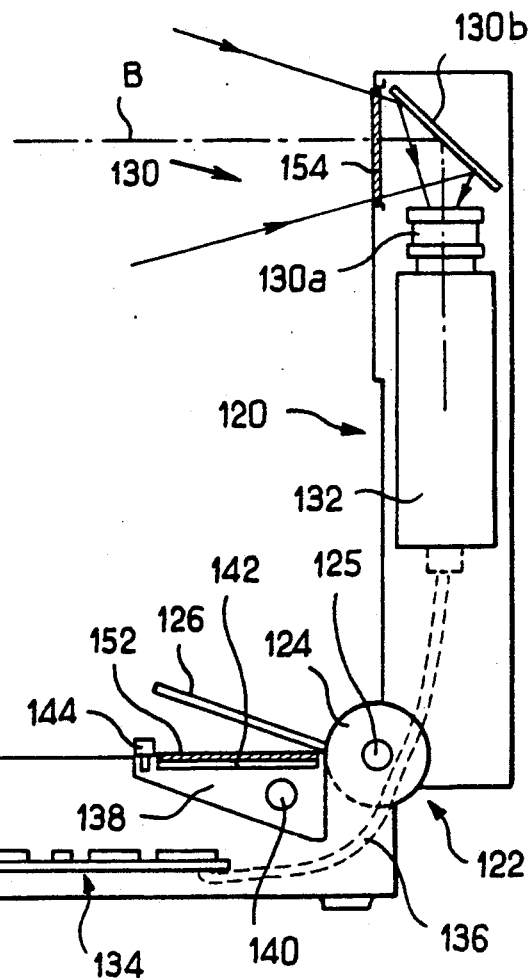
FIG_7

HINGED-CASE SOUND AND VISION COMMUNICATIONS TERMINAL, IN PARTICULAR A VIDEO-PHONE

This application is a continuation of application Ser. No. 07/249,134, filed Sep. 26, 1988 now abandoned.

FIELD OF THE INVENTION

The present invention relates to telecommunications, and more particularly to a sound and vision communications terminal, enabling a first party to communicate in sound as well as images with a distant party equipped with an analogous terminal, said communication taking place via a network.

BACKGROUND OF THE INVENTION

In conventional manner, such a terminal comprises a camera fitted with a lens system, a monitor screen, manual and/or automatic control means, and an electronic assembly for the purposes of control, coding/decoding, and transmission line interfacing.

The above-mentioned equipment is housed in a case or box generally intended to rest on a table at which the speaker is sitting, and it is associated with a telephone set.

In order to obtain a satisfactory image of a speaker, it is necessary for the picture to be taken from a considerable height above the table, typically 20 cm to 30 cm.

For this reason, the front face of a conventional video-phone case is relatively tall and has the lens system located near its top. In order to ensure that the eyes of the speaker look in a direction which is close enough to the lens system, the monitor screen also needs to be located in the top portion of said front face.

As a result, such a terminal is normally relatively heavy and occupies too much table space.

Another drawback of a conventional terminal lies in the fact that the case of the terminal and its camera lens system are fixed. As a result, the lens system is centered in an average direction which is deemed suitable for people having a wide range of heights. This means that very short people or very tall people may be poorly centered in the camera field of vision, and, indeed, portions of their faces may be off-screen.

Prior U.S. Pat. No. 4,258,387 describes a video-phone type terminal including a case comprising two parts which are hinged to each other. The case may take up a closed position for transport purposes and an open position in which its two parts are at an angle of about 90° to each other. Provision is also made, when it is desired to change the camera aiming direction, to mount the camera on the opening part of the case so that its orientation relative to said part can be varied.

SUMMARY OF THE INVENTION

The present invention seeks to mitigate these drawbacks of the prior art and to provide a terminal of this type in which the camera field of view can easily be adapted to the stature of the speaker, with the speaker being centered optimally each time, without it being necessary to provide special mounting means for the camera.

Another object of the invention is to provide a terminal in which the manual control means are very easily accessible.

To this end, the present invention provides a terminal for sound and vision communications, of the type associated, in particular, with a telephone set, and comprising a case containing a display screen monitor, a camera provided with optics, an electronic assembly for control, coding/decoding, and telephone line for interfacing purposes, and control means; and in which the case comprises a first part via which the terminal is supported on a support surface, and a second part which is hinged to the first part about a substantially horizontal axis and which receives the camera and its optics together with the monitor, said terminal being such that, in use, the second part of the case is capable of taking up at least two different angular positions relative to the first part corresponding to two different aiming directions for the camera.

BRIEF DESCRIPTION OF THE DRAWINGS

Embodiments of the invention are described by way of example with reference to the accompanying drawings, in which:

FIG. 1a is an overall perspective view of a terminal in accordance with the invention, shown in a first position;

FIG. 1b is an overall perspective view of the terminal of FIG. 1a in a second position;

FIG. 2 is a diagrammatic side view, partially in section, showing the terminal of FIGS. 1a and 1b in its FIG. 1b position;

FIG. 6 is a diagrammatic side view of the optics shown in FIG. 5; and

FIG. 7 is a view similar to FIG. 2 showing an additional arrangement in accordance with the present invention.

DESCRIPTION OF PREFERRED EMBODIMENTS

Figure 3A:
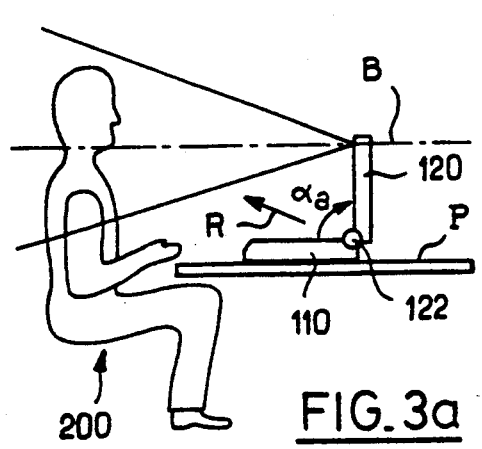
FIGS. 3a and 3b are overall side views of two utilization positions of the terminal adapted to speakers of different heights.

As shown in FIGS. 1a and 1b, a sound and vision communications terminal of the video-phone type in accordance with the present invention comprises a case 100 constituted by two parts 110 and 120 which are of similar size and which are hinged to each other about a horizontal axis A.

The first part 110 of the case is generally rectangular in shape and has a sloping front face 112 supporting a set of control buttons 114. An on/off switch 116 and a power-on indicator lamp 118 are also provided near its front end.

As can be seen, part 110 of the case is the part which stands on a surface such as a table.

A hinged connection 122, is provided at the rear end of the part 110, hinging it to the part 120 about the axis A, thereby making the part 120 movable between a closed position (FIG. 1a) in which said part 120 is located against the top plane face of the part 110, and one out of a plurality of several open positions (FIG. 1b) in which the part 120 extends generally upwardly relative to the part 110.

In the present example, the hinged connection 122 is constituted by a set of externally cylindrical bearing journals 124 fixed in alternation to the parts 110 and 120 of the case, said bearing journals being suitable for rotating about a common shaft 125 (FIG. 2).

A shutter flap 126 for auxiliary lighting means described in greater detail below is also pivotally mounted about said shaft by means of two vertical end plates 126a.

As shown in FIG. 1b, the top region of the moving part 120 of the case includes a display monitor whose screen is referenced 128, together with the optics 130 of a video camera having a predetermined aiming direction (axis B).

In the present embodiment, the hinged connection 120 is of the snug fit type. Thus, the moving part 120 of the case can take up any desired angular position relative to the fixed part 110, at least over a range of angles greater than a predetermined smallest opening angle.

Figure 3B:
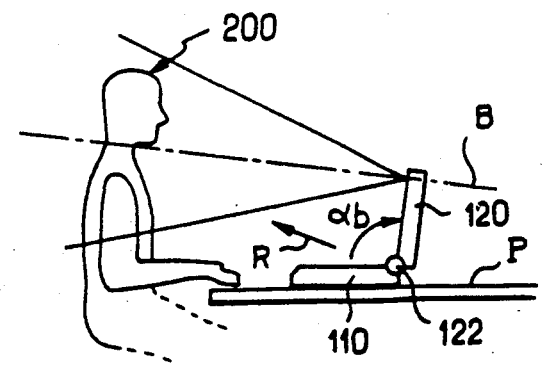

As can be seen in FIGS. 3a and 3b, this snug fit hinge makes it possible to vary the angle at which the screen and the camera are inclined relative to the horizontal, thereby constituting a first advantage of the invention. It is thus possible to vary the aiming direction of the camera, in particular as a function of the height or the posture of the speaker.

Thus, FIG. 3a is a diagram showing a relatively small speaker 200. In order to center this speaker properly, the moving part 120 of the terminal occupies a position which, together with the fixed part 110, defines an opening angle $\alpha_a$ of about 90°.

When a taller speaker uses the terminal, it is merely necessary to push back the part 120 so as to increase the opening angle, thereby raising the aiming direction B (angle $\alpha_b$ in FIG. 3b), with the snug fit serving to hold said parts 120 in any desired position.

In FIG. 3b the angle $\alpha_b$ is about 100° C.

Thus, the terminal can be adapted to take up different aiming positions in a simple and effective manner depending on the height above the plane P on which the terminal stands of the scene to be transmitted.

Naturally, the parts 110 and 120 of the terminal case may be of any other desired shape without going beyond the scope of the invention.

Further, although the above description relates to a terminal standing on a table at which the speaker is sitting, the invention naturally extends to a terminal suitable for mounting on a wall, with the fixed part then being fixed vertically on a wall.

In this case, the hinge with the moving part may be provided either in the top region of the fixed part, in which case increasing the opening angle raises the aiming direction of the camera, or else in the bottom region of the fixed part, in which case increasing the opening angle lowers the aiming direction.

Further, the configuration of FIGS. 1a and 1b may be designed so that the moving part can be opened up to 180° relative to the fixed part. This is advantageous, for example, when the video-phone is placed on the ground, with the face of the speaker then being practically vertically above the camera optics, and more generally it may be advantageous under any circumstances where the face of the speaker is located vertically above the terminal.

Further, it should be understood that the invention also covers circumstances where the two parts of the terminal are hinged at the front, with the camera and the screen then being provided on the top face of the moving part. In this case, the camera and the screen are exposed and the terminal can therefore be used even when the case is in its closed position or in positions where the two parts are at a small angle to each other.

FIG. 2 shows more details of the internal organization of the terminal shown in FIGS. 1a and 1b.

The camera 132 is preferably of the charge-coupled device (CCD) type which has the advantage of being small in size.

The camera 132 is placed flat inside the part 120 of the case, i.e., essentially perpendicularly to the aiming direction B, and the camera optics include an objective lens system 130a and a mirror 130b at an angle of about 45° to the aiming direction B. It may be observed that the image inversion caused by reflection in the mirror 130b is easily corrected electronically by inverting the scanning direction in the camera sensor. Further, it is also possible to use angle-deflecting means other than a mirror, e.g., a prism or optical fibers.

The flat disposition of the camera 132 makes it advantageously possible to considerably reduce the thickness of the part 120 of the terminal.

It may also be observed in FIG. 2 that the fixed part 110 of the case houses all of the terminal's electronics, as shown diagrammatically at 134.

A bundle of cables 136 connects the monitor screen 128 and the camera 132 to the electronic assembly 134, by passing through two adjacent bearing journals 122 which are hollow and fixed respectively to the part 110 and to the part 120.

An auxiliary lighting device, as mentioned above, is provided at the rear of the fixed part 110 of the case (to the right in FIG. 2) and comprises a light source, such as a tube 140 whose axis runs parallel to the axis A, received in a cavity 138 of essentially triangular cross-section formed in the top face of said part 110, together with the above-mentioned flap 126 and a horizontal translucent plate 142 which closes the top of the cavity and which constitutes a diffuser for the light rays emitted by the source.

Further, the light intensity projected by the lamp 140 can be continuously varied by a linear slider 144, e.g., controlling an electronic dimmer (FIGS. 1b and 2) and received in the front edge of the plate 142.

The purpose of such an auxiliary lighting device is to compensate for poor illumination of the speaker's face, which is normally illuminated only from above (the sun, ceiling lamps, etc.).

It is advantageously used under artificial light which is of very low intensity compared with daylight, for the purpose of illuminating the subject from below (light rays R in FIGS. 2, 3a, and 3b), thereby adding to the illumination from above and thus attenuating zones of shadow on the subject, and in particular on the subject's face, thus providing the camera with a less contrasty image, which is more satisfactory when the video means used (the screen and the camera) are low resolution devices.

The adjustable flap 126 is hinged as a snug fit on the shaft 125 and is therefore capable of taking up any desired position. As a result it, too, can modulate the auxiliary lighting as a function of ambient lighting conditions.

Thus, the present invention provides a video terminal of the video-phone type having the advantage that the aiming direction is adjustable in simple manner to the subject using the terminal.

The final stage of closing the case serves to simultaneously close the flap 126 over the auxiliary lighting means.

Another advantage of the present invention lies in that the screen/camera assembly is at a considerable distance from the subject when the terminal is in the open position, said distance being typically about 40 cm to 80 cm, while simultaneously leaving the various manual control buttons (e.g., for adjusting the brightness and the color of the screen, etc.) easily accessible to the user since they are situated at the front end of the fixed horizontal part 110.

Figure 4:
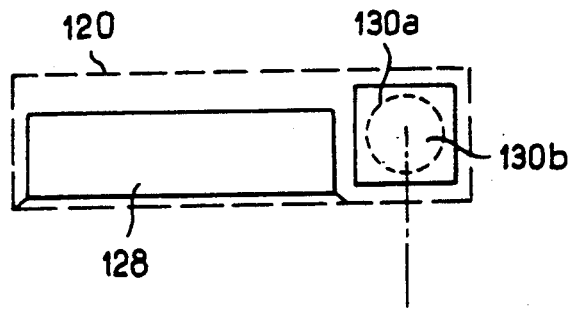
FIG. 4 is a diagrammatic plan view of a portion of the terminal in a utilization position, and it illustrates, in particular, the off-axis position of the user relative to the camera optics.
Figure 4:
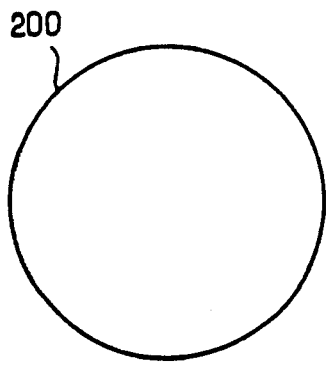

With reference to FIG. 4, it may be observed that since the display screen 128 and the camera optics 130 are disposed side-by-side, the subject tends, in general, to be situated in front of the screen and therefore to be off-axis relative to the optics 130.

Since the camera lens system generally has a very short focal length, e.g., about 8 mm to 10 mm, this off-axis position would be very noticeable and distracting by virture of the deformation of the displayed vertical lines due to the parallax effect if the lens system were to be aimed along axis B, as shown in FIG. 4.

Means for compensating this alignment defect and for providing the required parallax correction in accordance with another aspect of the present invention consist in giving suitably selected orientations to the camera optics and to the plane of the photo-sensitive element of the camera, in a manner described below.

Figure 5:
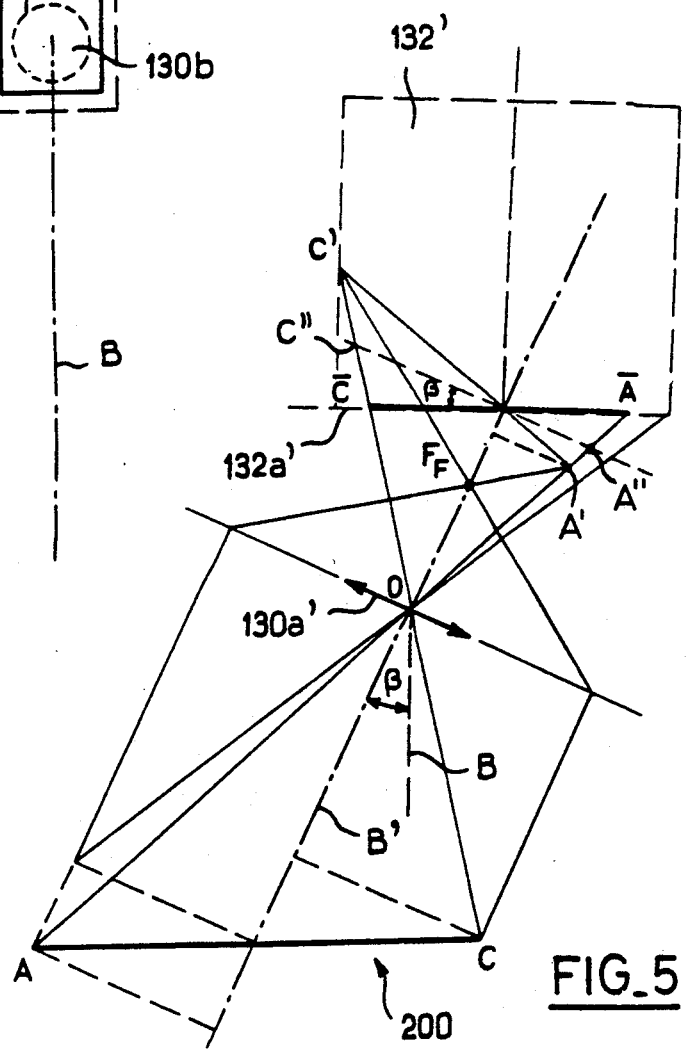
FIG. 5 is a diagrammatic top plan view of the camera optics showing how the effects of said off-axis position are compensated.

FIGS. 5 and 6 show the FIG. 4 situation diagrammatically with the mirror 130b omitted and with the camera being shown as a virtual camera 132' having a virtual lens system 130a' as determined by said mirror. This has no effect on the reasoning below.

In accordance with the invention, the axis B' of the lens system, which is represented by a single lens 130a', is skewed, at an angle β which is selected as a function, in particular, of the width of the display screen 128 and the distance to the subject 200 in front of the display screen.

The face of the subject 200 and the background as displayed are represented by the vertical rectangle A1A2C2C1 (and straight line AC in FIG. 5), lying parallel to the screen 128 and thus skewed relative to the lens system. The image of the rectangle is formed at A'C' (FIG. 5) or A'1A'2C'2C'1 (FIG. 6), and it can be seen that by virtue of the above-mentioned misalignment, the image is highly trapezoidal. If the sensitive plane of the camera were parallel to the lens system 130a', then the image of the rectangle A1A2C2C1 (straight in A"C" in FIG. 5) would also be trapezoidal.

In accordance with the invention, the sensitive plane 132a' is pivoted about a vertical axis contained in said plane and intersecting the axis of the lens system, thereby causing the sensitive plane (the real image plane) to be maintained substantially parallel to the subject whose image is to be reproduced (above-mentioned rectangle), i.e., essentially parallel to the display screen 128 or to the front face of the terminal.

The image of the subject-representing rectangle thus becomes $\overline{A1A2C2C1}$ (FIG. 6) or $\overline{AC}$ (FIG. 5) and is therefore likewise a rectangle, as shown by the geometrical lines in FIGS. 5 and 6.

As a result, the aiming error due to the skewing of the camera relative to the user is compensated in a manner which is simple and cheap, by inclining the lens system so that the new aiming direction B' is directed along the above-specified skew direction, with the plane of the virtual sensitive surface of the camera remaining essentially parallel to the screen.

As mentioned above, an essential characteristic of the invention lies in the aiming direction of the camera being adaptable by pivoting the moving part 120 of the terminal so as to match the height or the position of the speaker in the vertical direction.

According to the invention, means are provided for assisting the speaker to orient the moving part of the terminal correctly as a function of speaker position or height, thereby enabling the speaker to permanently monitor the field of view of the camera.

According to a first aspect of the invention, these means comprise, again with reference to FIG. 2, a semi-reflecting mirror 150 (shown in dashed lines) placed in front of the camera lens system. This mirror is preferably spherical and convex so as to impart a relatively wide angle image to the user with the rays it reflects, while the rays it passes are captured normally by the camera in order to form the image to be transmitted.

Preferably, one or more marks, which may be engraved in the outside surface glass of the mirror, are provided to enable the speaker to move the moving part 120 of the terminal until the image of a part of the speaker's body, e.g., the head, occupies a predetermined position relative to said mark(s).

For example, the mark may be a circle in which the user is to center the image of his or her own head by moving the moving part 120.

Alternatively, a fully reflecting mirror may be disposed in the vicinity of the camera optics.

In a variant of the invention, the means for providing assistance in positioning are constituted by the monitor screen itself. More precisely, if the screen is constituted by a screen having a small observation cone, the user can position the hinged part 120 properly by displacing it unitl the image shown on its screen is of optimum quality.

The display screen may be a liquid crystal screen, for example.

It may be recalled that a liquid crystal screen having a small observation cone is characterized by forming an image which is visibly degraded when the real observation direction is too far from a privileged observation direction perpendicular to the plane of the layer of liquid crystals. More precisely, once the light rays emitted by the screen are excessively inclined relative to said plane, the light polarization-changing effect obtained by exciting and deexciting the crystals no longer provides satisfactory contrast in the display by the liquid crystal screen.

Thus, the well-known defect of certain liquid crystal screens is transformed in this application, into an advantage making it easy to align the terminal on the speaker.

Another solution for a display screen having a small observation cone could consist in an ordinary cathode roy tube fitted with a microscopic venetian blind filter or the like at its surface, thereby allowing light rays to escape only within the desired observation cone. A grid of crossed horizontal and vertical microscopic venetian blinds may be provided, for example.

According to yet another aspect of the present invention, and with reference of FIG. 7, means are provided to prevent and above-described auxiliary lighting from giving rise to undesirable reflections in the resulting image, e.g., on the lenses of a pair of spectacles worn by the speaker.

These means preferably comprise a polarizing screen 152, which, in the present example, is disposed on top of the translucent screen 142 of the auxiliary lighting means and which extends parallel thereto, together with a polarizing receiving screen 154 disposed in front of the camera optics 130. The polarization may be linear or circular. In this way, specular reflections on said spectacles, i.e., undesirable reflections, are eliminated. In addition, the partial reflection effect which may exist on such a receiving polarizing screen 154 may enable it to act as the above-described semi-reflecting mirror 150 for the purpose of establishing the correct positioning relationship between the subject and the camera.

Further, several variants may be designed for the various arrangements of the invention described in detail above.

Firstly, the moving part 120 of the terminal may be retained in one out of a plurality of possible inclinations by means other than a snug fit, and in particular by any suitable spring and ratchet mechanism or the like defining a given set of possible locking positions.

Another solution may consist in overcoming a point of resistance between two or more stable utilization positions.

Further, the two parts of the terminal case may be pivoted relative to each other by means of an electric motor, in which case two-way control buttons may be provided on the fixed part of the case.

In another variant of the invention, the electronic assembly of the terminal may be received in the moving part 120 thereof, in which case it will be considerably more voluminous than the fixed part 110, which then serves merely as a support for the terminal.

Further, it is particularly advantageous for the terminal to be switched on automatically whenever it is opened, and for it to be put into standby mode whenever the case is closed. Practical means for achieving this end may comprise a conventional spring-biased microswitch carried by the fixed part 110 and subjected to the action of a finger or the like which is fixed to the moving part 120.

In another variant of the invention, instead of the auxiliary lighting means being controlled manually, as described above, they may be controlled automatically in response to a brightness signal. This brightness signal may be obtained from a photodiode or photoresistor type sensor provided in the vicinity of the camera optics, or else it may be constituted, by means of a suitable processor, on the basis of the output signals from the camera 132 so as to ensure that the brightness of the speaker and in particular of the speaker's face are satisfactory for obtaining a proper image.

Further, the auxiliary lighting means may include any appropriate arrangement, e.g. mirrors, lenses, prisms, etc., for obtaining a beam of given concentration which is directed towards the subject.

A practical embodiment of a terminal in accordance with the invention for home use may have the following characteristics:
case width: 12 cm to 15 cm;
case length: 25 cm to 30 cm;
thickness of closed case: 7 cm to 10 cm;
height of open case: 25 cm to 30 cm;
maximum opening angle of moving part: 110°;
CCD color camera having a resolution of about 150×250 and a focal length of about 8 mm to 12 mm; and
flat cathode ray color tube of equal or better resolution.

Finally, it may be observed that a terminal in accordance with the invention may be used either in association with a conventional type of telephone together with a suitable interconnection, or else it may have such a telephone integrated therein. It is preferable for the so-called "hands free" function to be available so as to provide communication by image and by sound with the speaker and without using a telephone handset.

We claim:

1. A terminal for sound and vision communications, of the type associated, in particular, with a telephone set, and comprising a case, said case consisting of:

(a) a first, fixed part via which said terminal is supported on a support surface, said first, fixed part containing an electronic assembly for control, coding/decoding, and telephone line interfacing and control means; and (b) a second, movable part which is hinged to said first part about a substantially horizontal axis and which receives a display screen monitor and a camera provided with optics, said second part being capable of assuming a first, closed angular position resting against said first part and at least two open angular positions relative to said first part corresponding to two different aiming directions for said camera;

(c) said second part being substantially flat and elongated and receiving said camera so that an aiming direction of said camera is perpendicular to a plane of said second part, said optics including means provided in a region of said second part that is most remote from said hinge for deflection through 90° of an image sensed by said camera;

(d) said display screen monitor being also provided in said region of said second part that is most remote from said hinge and close to said deflecting means;

(e) whereby the thickness of said second part of said case is minimized and said aiming direction of said camera provided with said optics is displaced, in use, well above said support surface; and (f) wherein, in the utilization position, said camera optics is offset laterally relative to said display screen monitor, and wherein said terminal includes parallax correction means comprising a camera lens disposed in such a manner that the aiming direction of said camera is laterally inclined by a predetermined angle, with a sensitive plane of said camera being inclined by approximately the same angle relative to the plane perpendicular to said aiming direction.

2. A terminal according to claim 1, wherein said first and second parts of the case are flat rectangular boxes hinged to each other along short edges of said boxes.

3. A terminal according to claim 2, wherein said first and second parts of said case are hinged to each other about a hinged connection comprising successive bearing journals fixed in alternation to both of said parts and capable of rotating about a common shaft.

4. A terminal according to claim 3, wherein said hinged connection is a snug fit enabling said terminal to be placed in an unlimited number of angular utilization positions within a 5. A terminal according to claim 2, wherein manual control members are provided in a region of said first, fixed part that is most remote from said hinge.

6. A terminal according to claim 1, further including auxiliary lighting means located in said first, fixed part of said case in the vicinity of the hinge and providing generally upwardly directed illumination.

7. A terminal according to claim 6, wherein said auxiliary lighting means include a flap for modulating auxiliary lighting as a function of ambient lighting conditions, said flap being hinged about an axis of said hinge between said first and second parts of said case.

8. A terminal according to claim 6, further including a polarizer disposed at an outlet from said auxiliary lighting means and a screen disposed at an inlet to said camera optics.

9. A terminal according to claim 1, wherein, in the utilization position, said camera optics is offset laterally relative to said display screen monitor, and wherein said terminal includes parallax correction means.

10. A terminal according to claim 1, further including means for assisting a user of said terminal to position said moving part of said case into a desired angular position for utilization.

11. A terminal according to claim 10, wherein said means for assisting a user comprise a mirror disposed in the vicinity of said inlet to said camera optics.

* * * * *